(12) United States Patent
Juranitch

(10) Patent No.: US 11,867,041 B2
(45) Date of Patent: Jan. 9, 2024

(54) CONTINUOUS CHAMBER CAPILLARY CONTROL SYSTEM, METHOD, AND APPARATUS

(71) Applicant: XDI Holdings, LLC, Bedford, NH (US)

(72) Inventor: James C. Juranitch, Ft. Lauderdale, FL (US)

(73) Assignee: XDI Holdings, LLC, Bedford, NH (US)

( * ) Notice: Subject to any disclaimer, the term of this patent is extended or adjusted under 35 U.S.C. 154(b) by 0 days.

(21) Appl. No.: 17/326,640

(22) Filed: May 21, 2021

(65) Prior Publication Data

US 2022/0042405 A1 Feb. 10, 2022

Related U.S. Application Data

(63) Continuation of application No. 16/080,496, filed as application No. PCT/US2017/019983 on Feb. 28, 2017, now Pat. No. 11,028,676.

(60) Provisional application No. 62/301,527, filed on Feb. 29, 2016.

(51) Int. Cl.
*E21B 43/24* (2006.01)
*E21B 41/00* (2006.01)
*C09K 8/592* (2006.01)
*E21B 47/07* (2012.01)

(52) U.S. Cl.
CPC .......... *E21B 43/2406* (2013.01); *E21B 41/00* (2013.01); *E21B 43/2408* (2013.01); *C09K 8/592* (2013.01); *E21B 47/07* (2020.05)

(58) Field of Classification Search
CPC ............ E21B 43/2406; E21B 41/0092; E21B 43/2408; C09K 8/592
See application file for complete search history.

(56) References Cited

U.S. PATENT DOCUMENTS

| | | | |
|---|---|---|---|
| 3,353,360 A | 11/1967 | Gorzegno | |
| 4,399,865 A * | 8/1983 | Anderson | E21B 36/00 166/57 |
| 4,648,455 A * | 3/1987 | Luke | E21B 43/24 166/269 |
| 5,470,749 A | 11/1995 | Djabbarah et al. | |
| 6,158,510 A | 12/2000 | Bacon et al. | |
| 6,409,219 B1 * | 6/2002 | Broome | E21B 43/04 285/124.1 |
| 7,350,577 B2 | 4/2008 | Howard et al. | |
| 7,367,399 B2 * | 5/2008 | Steele | E21B 43/2408 166/57 |
| 9,574,404 B2 * | 2/2017 | Tunget | E21B 17/00 |
| 9,720,424 B2 | 8/2017 | Ige et al. | |
| 9,790,782 B2 * | 10/2017 | Xia | E21B 49/08 |
| 9,890,612 B2 * | 2/2018 | Diez | E21B 33/1285 |
| 10,006,282 B2 * | 6/2018 | Livescu | E21B 47/07 |
| 10,233,744 B2 | 3/2019 | Shirdel et al. | |

(Continued)

*Primary Examiner* — Jonathan Malikasim
(74) *Attorney, Agent, or Firm* — Dykema Gossett PLLC

(57) ABSTRACT

A system for enhanced oil and gas recovery. The system can comprise a boiler. The system can further comprise at least two capillaries in fluid communication with the boiler. The at least two capillaries can be disposed in an injector pipe and each one of the capillaries can include a flow control device for controlling an injection of steam in at least one of a chamber and a well for enhanced oil and gas recovery.

15 Claims, 5 Drawing Sheets

(56) References Cited

U.S. PATENT DOCUMENTS

| | | |
|---|---|---|
| 10,590,749 B2 | 3/2020 | Sanders et al. |
| 11,035,181 B2 * | 6/2021 | Juranitch ................. E21B 34/02 |
| 11,053,789 B2 * | 7/2021 | Maher ....................... G06N 3/02 |
| 2003/0131989 A1 * | 7/2003 | Zakiewicz ............ E21B 43/162 |
| | | 166/272.2 |
| 2005/0103497 A1 * | 5/2005 | Gondouin ............. E21B 43/121 |
| | | 166/57 |
| 2007/0175638 A1 * | 8/2007 | Crichlow ................ E21B 43/24 |
| | | 166/302 |
| 2009/0071647 A1 * | 3/2009 | Vinegar .................. E21B 47/00 |
| | | 166/266 |
| 2009/0166033 A1 | 7/2009 | Brouwer et al. |
| 2015/0198025 A1 | 7/2015 | Baird et al. |
| 2017/0074082 A1 * | 3/2017 | Palmer .................. E21B 36/003 |

* cited by examiner

CONTINUOUS CHAMBER CAPILLARY CONTROL SYSTEM, METHOD, AND APPARATUS

CROSS-REFERENCE TO RELATED APPLICATION

This application is a continuation of U.S. application Ser. No. 16/080,496, filed 28 Aug. 2018 (the '496 application), which is the national stage application of International application no. PCT/US17/19983, filed 28 Feb. 2017 (the '983 application) and published under International publication no. WO 2017/151640 A1 on 8 Sep. 2017. This application claims the benefit of U.S. provisional application No. 62/301,527, filed 29 Feb. 2016 (the '527 application). The '496 application, '983 application and the '527 application are all hereby incorporated by reference in their entirety as though fully set forth herein.

FIELD

Embodiments of the present disclosure generally relate to a system, method, and apparatus for the precise, continuous and real time control applied to the injection of steam and or steam with super-heat with or without solvent or surfactant assist in a chamber or well for enhanced oil and gas recovery.

BACKGROUND

Steam can be generated by methods such as Once Through Steam Generators (OTSG), Direct Steam Generators (DSG), Drum Boilers, or other methods. These methods can use a pipe to inject steam into a reservoir containing oil or gas to form a chamber below ground in a reservoir or to generally reduce the viscosity of the desired bitumen or heavy
hydrocarbons to facilitate recovery of the valued energy asset. This method can be used in Steam Assisted Gravity Drain (SAGD) bitumen production, and/or Cyclic Steam Stimulation (CSS) processes, Steam Flood and other oil and gas recovery processes. In the current applications, typically one or two outlets are used to inject the steam or steam with solvents, light hydrocarbons, or surfactants. For example, in Steam Flood and CSS, typically one steam outlet is used in a well. Occasionally, additional single outlet fill-in injection wells can be employed. In SAGD, typically one outlet is used at the heel of the injector or beginning of the chamber and one outlet is used at the toe of the injector or end of the chamber. Crude control of the steam flow is accomplished with steam splitters which typically have fixed flow but in rare occasions can have variable flow. Typically, even in the most advanced SAGD applications only 2 or 3 steam splitters are employed and they typically are not adjustable without being removed from the chamber and being brought to the surface. This renders the control of current state of the art steam injection systems to be poor at best. Many natural steam diversions, such as shale deposits, mud deposits, steam thieves such as fissures and the natural permeability differences in the reservoir make the formation of a chamber less than perfect. Common problems such as "Dog Boning" in the development of chamber shapes can occur. Steam is therefore applied poorly to the new bitumen and energy is wasted. As a result, bitumen or other unconventional energy products can be associated with a higher cost of extraction from the reservoir. This can increase the Steam Oil Ratio (SOR), increase the producer's operating expense (OPEX), and erode the producer's already thin production profit.

SUMMARY

A system for enhanced oil and gas recovery. The system can comprise a boiler. The system can further comprise at least two capillaries in fluid communication with the boiler. The at least two capillaries can be disposed in an injector pipe and each one of the capillaries can include a flow control device for controlling an injection of steam in at least one of a chamber and a well for enhanced oil and gas recovery.

A system for enhanced oil and gas recovery. The system can comprise a boiler. The system can further comprise at least two capillaries in fluid communication with the boiler. The at least two capillaries can be disposed in an injector pipe and each one of the capillaries can include a flow control device that is a control valve. The control valve can provide for an automatic control of steam through each capillary in at least one of a chamber and a well for enhanced oil and gas recovery.

A system for enhanced oil and gas recovery. The system can comprise a boiler. The system can further include at least two capillaries in fluid communication with the boiler. The at least two capillaries can be disposed in an injector pipe and each one of the capillaries can include a flow control device that is a control valve. The control valve can provide for an automatic control of steam through each capillary in at least one of a chamber and a well for enhanced oil and gas recovery. The automatic control of steam can be based on a statistically based self-learning control algorithm.

DETAILED DESCRIPTION

Figure 1:
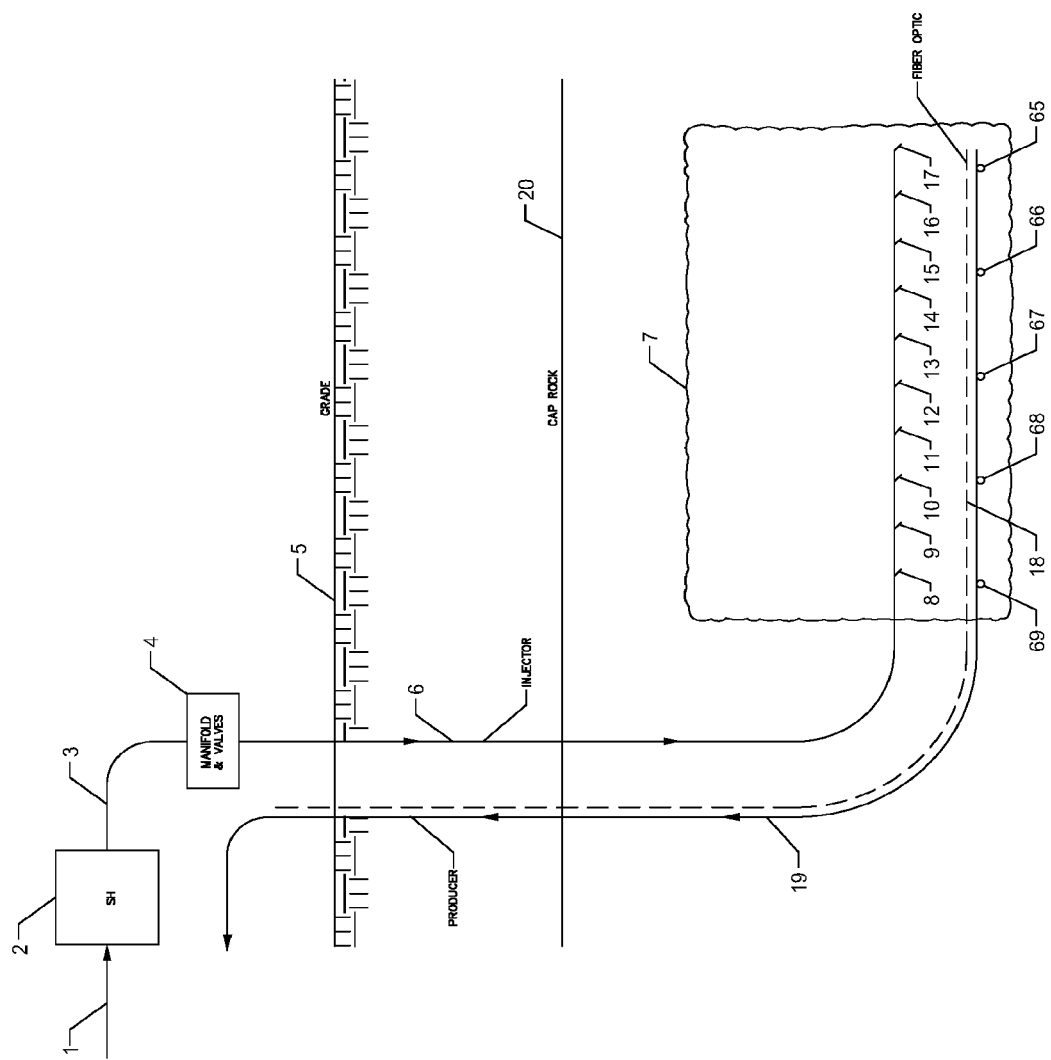
FIG. 1 depicts a system, method and apparatus for the precise control of steam and steam with super-heat with or without solvents, surfactants, or light hydrocarbon assistance in a chamber or well for enhanced oil and gas recovery.
Figure 2:
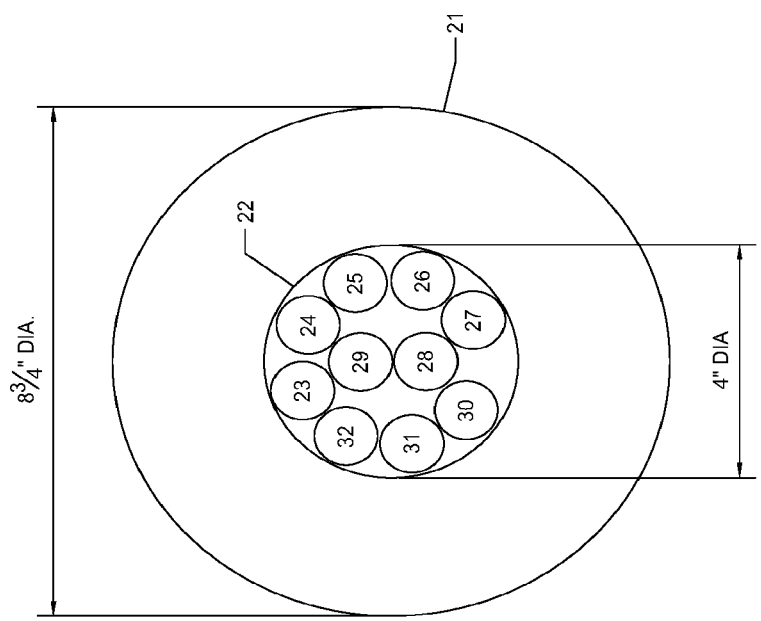
FIG. 2 depicts a capillary pipe system, method and apparatus for enhanced oil and gas recovery, in accordance with embodiments of the present disclosure.
Figure 3:
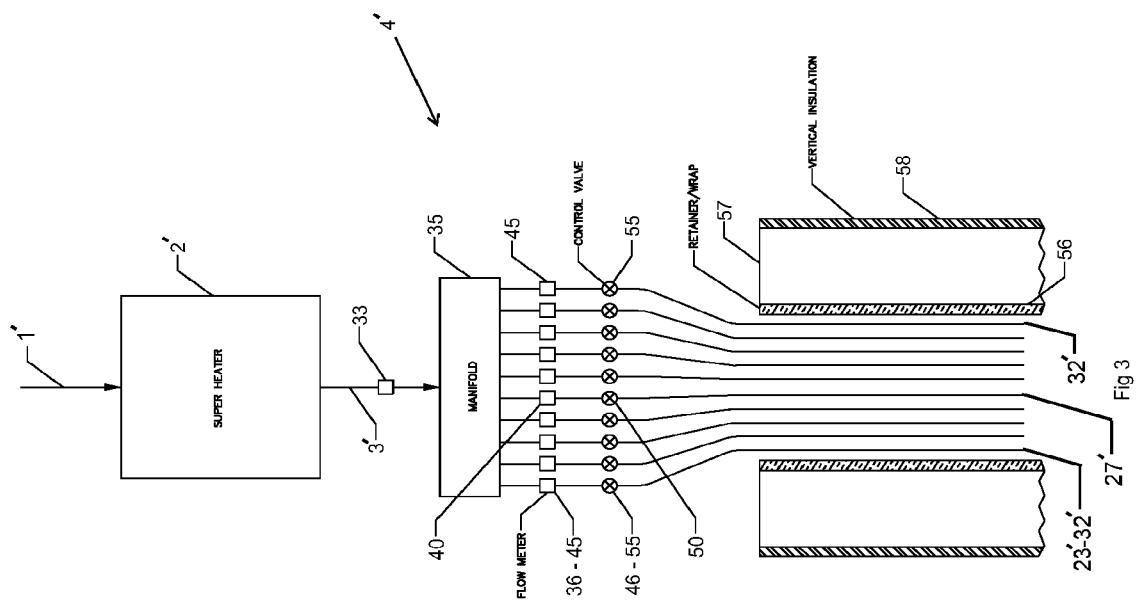
FIG. 3 depicts a detailed view of a capillary pipe system, method and apparatus for enhanced oil and gas recovery, in accordance with embodiments of the present disclosure.

This disclosure presents a better, more effective system, method, and apparatus, for the precise, continuous and/or real time control for the injection of steam and/or steam with super-heat, with or without solvent, surfactants, or light hydrocarbon assist in a chamber or well for enhanced oil and gas recovery. Embodiments of the present disclosure can include at least one of a system, method, and apparatus for reducing at least one of an enhanced oil or gas recovery system operating expense, steam oil ratio (SOR), or affecting the ideal chamber or well, steam or energy distribution, or formation. Embodiments of the present disclosure can advance the implementation of steam injection and steam injection with or without super-heaters with or without solvent, surfactant, or light hydrocarbon assist, for use in oil and gas recovery. A preferred embodiment in a SAGD application is shown in FIG. 1. Steam, or preferably slightly super-heated steam, as further described in PCT application no. 2017/016,244, which is incorporated by reference as though fully set forth herein, can enter optional super-heater 2 via feed conduit 1. PCT application no. 2016/063,339 is incorporated by reference as though fully set forth herein. The super-heater 2 can be included in a preferred embodiment, since the control valves or fixed orifices and flow meters associated with manifold and valves 4 prefer single phase flow and typically perform with less repeatable results when exposed to multi-phase flow or slug flow. As stated in PCT application no. 2017/016,244, chamber 7 can respond better with the inclusion of super-heater 2. The outlet 3 of optional super-heater 2, in some embodiments can include an optional solvent, surfactant, and/or light hydrocarbon (e.g., methane, ethane, propane, butane, pentane, and/or hexane) injection system upstream of manifold and valves 4 (not shown for clarity in FIG. 1), which can meter the optional solvent, surfactant, and/or light hydrocarbon into a capillary system, as further shown in FIG. 3. With further reference to FIG. 3, in a preferred embodiment, super-heater outlet 3' can be fluidly coupled with an optional cumulative flow meter 33, which is in communication with manifold 35. As depicted in FIG. 3, manifold 35 can be in fluid communication with optional capillary flow meters 36 through 45. In some embodiments, the flow meters can be, for example, pitot-statics or sharp edged orifices. If the optional cumulative flow meter 33 and the flow meters 36 through 45 are included, then automatic error checking on the sum of the individual flow meters 36 through 45 versus the cumulative flow through 33 can be continuously performed to aid in increasing system trouble shooting and/or reliability. Control valves 46 through 55 feed into a respective one of capillaries 23' through 32' in injection pipe, wrap, or sleeve 22 (FIG. 2), and can be associated with a respective one of the individual flow meters 36 through 45. For example, flow meter 40 can be associated with a control valve 50 located on the same capillary. Although 10 capillaries are depicted in FIGS. 2 and 3, greater than 10 capillaries or fewer than 10 capillaries can be employed. For example, finer chamber control could be accomplished with a 5" diameter pipe or larger, sleeve or wrap and up to 20 capillaries. However, in some embodiments, 10 tubing capillaries can be used because this quantity fits into a conventional approximate 4" diameter pipe area (e.g., lumen) in a conventional 8¾" diameter well bore 21. As an example, as depicted in FIG. 2, a quantity of 10, 1 inch diameter tube capillaries can be disposed inside the 4" diameter pipe area. Different optional layers of insulation (e.g., insulative layers 57, 58 depicted in FIGS. 3 and 4), for example a vacuum pipe, can be utilized to improve efficiency. In some embodiments, a retainer and/or wrap 56 can be placed around the capillaries 23' through 32'.

Figure 4:
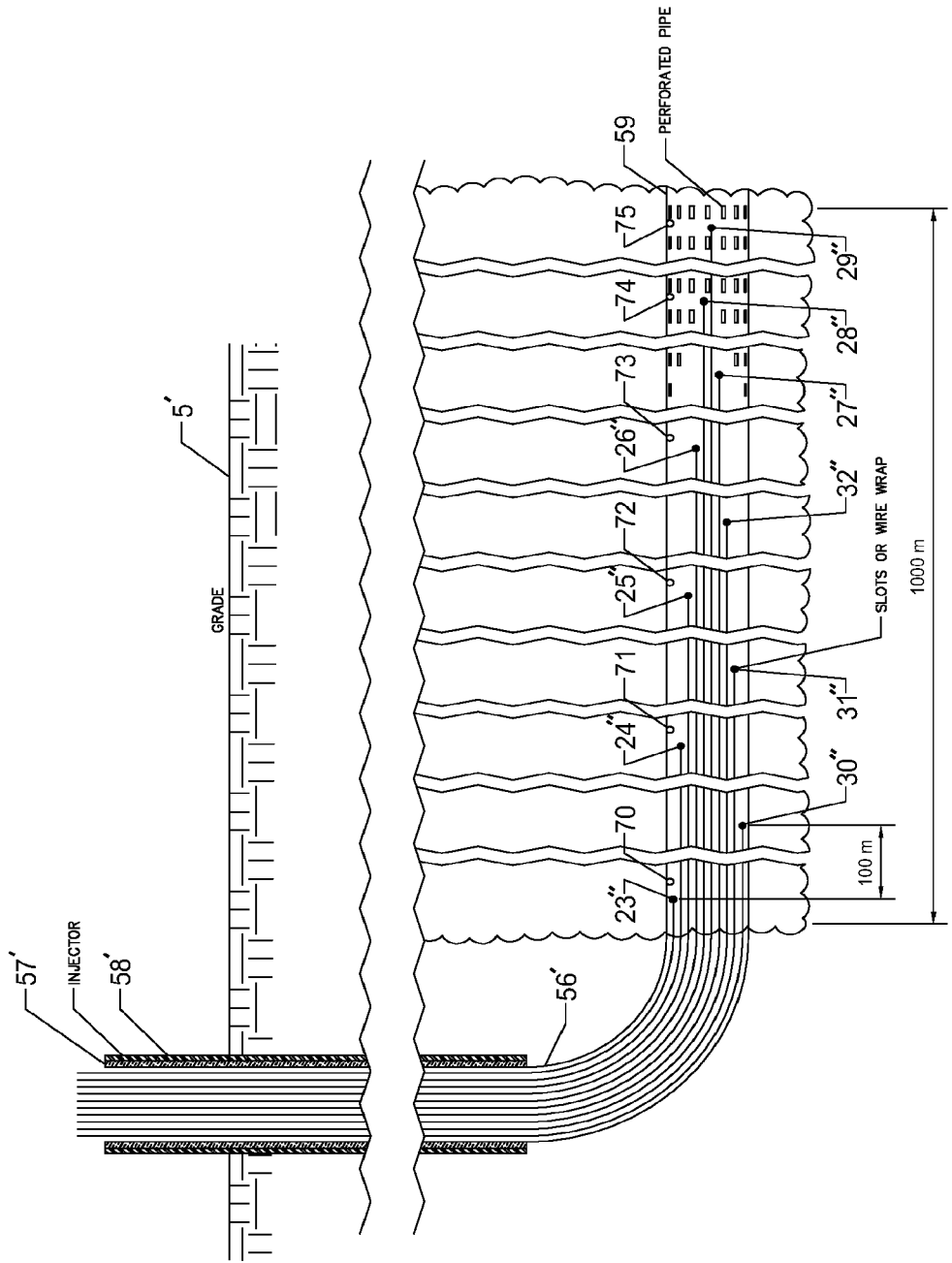
FIG. 4 depicts a detailed view of the sub-surface capillary pipe system, method and apparatus for enhanced oil and gas recovery, in accordance with embodiments of the present disclosure.

Capillary injector 6, shown in FIG. 1, can terminate in chamber 7. As shown in FIG. 1 and FIG. 4, a distal end (e.g., chamber/well end) of each individual tube of the capillary bundle can be disposed approximately in an equidistant distribution (e.g., approximately the same distance can separate each one of the distal capillary ends), but in some embodiments can be disposed in a staggered distribution (e.g., a different distance separates one or more of the distal capillary ends) in the chamber or well as shown in FIG. 5.

Figure 5:
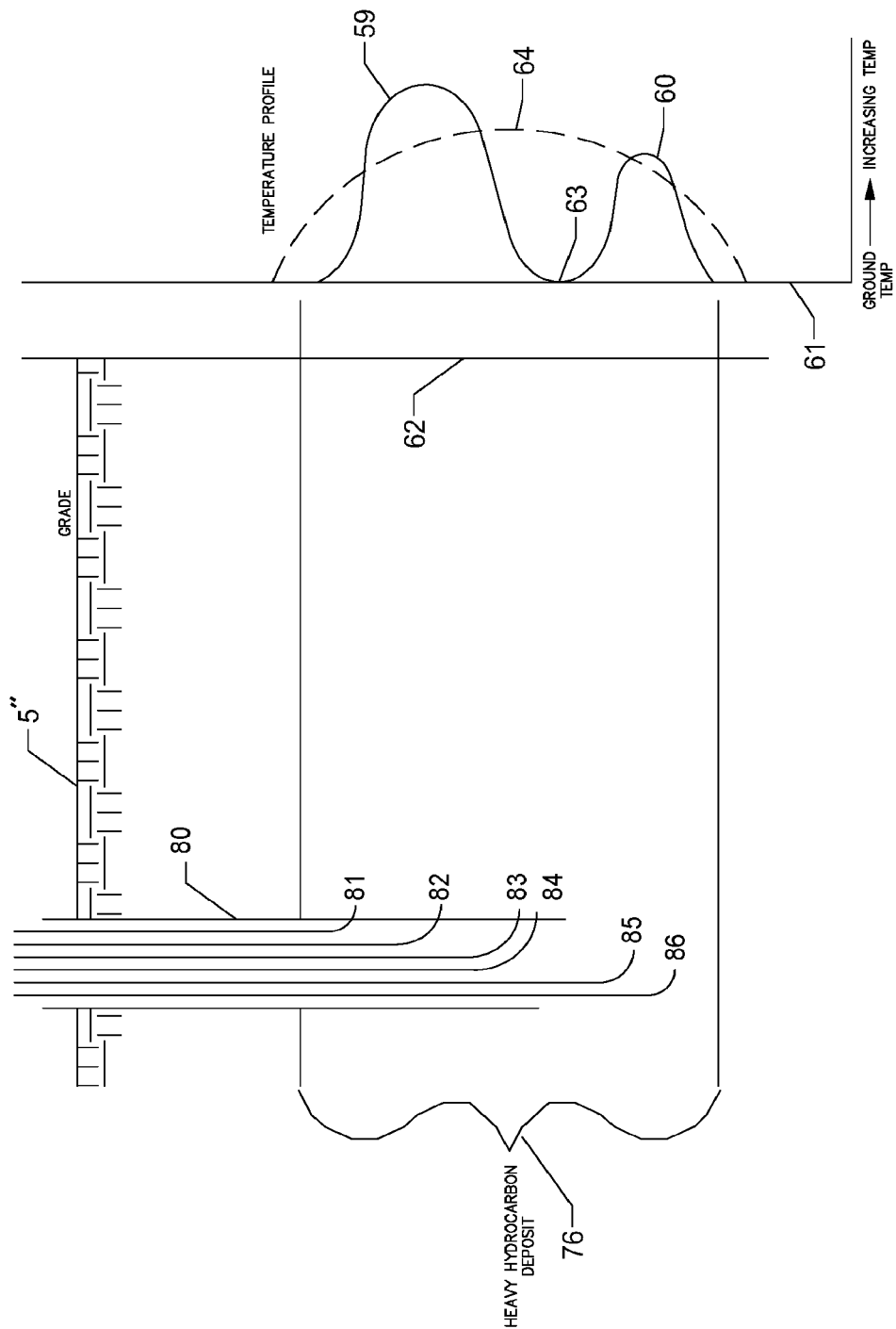
FIG. 5 depicts a temperature profile and a detailed view of the sub-surface capillary pipe system, method and apparatus for enhanced oil and gas recovery applied to CSS or Steam Flood, in accordance with embodiments of the present disclosure.

As depicted in FIG. 5, one or more distal capillary ends 80, 81, 82, 83, 84, 85, 86, can be staggered. For example, distal capillary ends 83 and 84 can be located at approximately the same region and/or depth below grade 5". In some embodiments, the staggered distal capillary ends 83 and 84 can be located approximately in the same region and/or depth below grade 5", depending on a temperature profile associated with a particular region, to increase a steam flow to the particular region around the staggered distal capillary ends 83 and 84 to prevent a temperature valley 63 from occurring, as further discussed herein. Distal capillary ends 8 through 17, shown in FIG. 1, illustrate an embodiment of the present disclosure where the capillary tubes (e.g., distal capillary ends 8 through 17) are exposed directly in the chamber 7. In a preferred embodiment, shown in FIG. 4, a distal end of each tube of the capillary system can be terminated and left open inside (e.g., in fluid communication with) a lumen formed by a perforated pipe or wire wrap injector pipe. Producer conduit 19 (FIG. 1) can have individual thermocouples 65 through 69, and/or preferably a fiber optic temperature feedback system 18, and/or another type of temperature feedback system.

In some embodiments, manual control of orifices or control valves 46 through 55 can be possible. In a preferred embodiment, closed loop automated precise, continuous and real time control can be applied to the injection of steam and/or steam with super-heat with or without solvent or surfactant, or light hydrocarbon assist into a chamber or well for enhanced oil and gas recovery, as described in PCT application no. 2017/016,244. In some embodiments, closed loop continuous control with discontinuous and/or continuous control algorithms can be employed to improve the performance associated with the injection of steam and/or steam with super-heat with or without solvent or surfactant, or light hydrocarbon assist and to provide higher resolution and control associated with the injection of steam and or steam with super-heat with or without solvent or surfactant, or light hydrocarbon assist in a chamber or well for enhanced oil and gas recovery.

In some embodiments, control strategies can be employed, such as pulsing the injection capillary to a reduced or minimum flow (including zero flow). In a preferred embodiment, a rate of change of the temperature response can be mapped based on temperature feedback obtained from the fiber optic temperature feedback system 18. The temperature feedback can be used to schedule control valves 46 through 55 to distribute (e.g., even out) the steam energy absorption throughout chamber 7 to effect the development of a particular chamber shape. For example, the steam energy absorption through chamber 7 can be scheduled via control valves 46 through 55 to effect a consistent and/or near perfect chamber shape in a homogeneous reservoir or a more complex idealized shape in a non-homogeneous reservoir.

In some embodiments, control strategies can be employed continuously and in real time, such as a continuous statistical analysis of a temperature profile, which can be assembled from data gathered by a temperature feedback system (e.g., fiber optic feedback system 18). In some embodiments, the temperature feedback system can be continuous over the chamber length. In some embodiments, the temperature profile can be adjusted which can result in a consistent, tight or minimum and/or well controlled sub-cool which can be less than 10 degrees C. and in some embodiments less than 5 degrees C. from injector line temperature, and consequently capillary injection temperature, as statistically measured in thermocouples 70 through 75. In some embodiments, sub-cool can be defined as a temperature difference between the injected steam (measured by the thermocouples 70 through 75 and produced fluid traveling through producer conduit 19 (FIG. 1). A flow from individual capillaries 23 through 32 can be scheduled and a flow between the distal ends (e.g., chamber/well ends) of the capillaries 23 through 32 can be averaged or interpolated. Interpolation is used to build a control relationship between a feedback such as subcool temperature in a section or all of the well and a control setpoint such as scheduled steam flow in a specific capillary or a group of capillaries that may be discontinuous in nature or difficult to characterize in a mathematical control algorithm. Control interpolation can usually be executed through look up tables that may be 2 or more dimensional in construction. In some embodiments, a flow of the steam can be controlled using interpolation related to a control feedback versus a flow of the steam scheduled between capillaries to obtain continuous varying control across at least one of the chamber and the well. As depicted in FIG. 4, the distal ends of the capillaries can be disposed approximately 100 meters from one another, although the distal ends can be disposed greater than or less than 100 meters from one another. This aforementioned control strategy can both increase production while reducing OPEX and SOR by the efficient and increased application of saturated and/or super-heated steam to the exposed bitumen and the ideal development of a preferred chamber shape. It should be known by those skilled in the art that the ideal chamber shape may not be a symmetric chamber if shale, thieves, and/or other non-homogeneous obstructions exist and the steam may not be normalized in its injection from each capillary output to compensate for these chamber obstructions or thieves. For example, an amount of steam flow from each capillary can be varied to account for non-homogeneous obstructions. In an example, a flow control device can be included on each capillary, which can control a flow of steam through the capillary. For instance, the flow control device can be a control valve (e.g., control valve 46-55) and/or an orifice disposed at a distal end of a capillary.

The same capillary system may be used in CSS or steam flood, as shown in FIG. 5. In FIG. 5, a perforated or wire wrapped pipe 6' may dispose its capillary openings in a different orientation which could be vertical, as shown in FIG. 5, or vertical and horizontal (e.g., angled) as existing in some CSS and steam flood wells. The goal of the control system, apparatus and method would be to direct the steam in heavy hydrocarbon deposit 76 as observed in an observation well 62 or other feedback system to produce a symmetric temperature or energy profile, as shown by ideal line (e.g., temperature profile) 64 in the temperature profile graph 61 in FIG. 5 and minimize peaks 60 and 59, and valleys 63. As previously discussed, in some embodiments, the staggered distal capillary ends 83 and 84 can be located approximately in the same region and/or depth below grade 5" to increase a steam flow to a particular region around the staggered distal capillary ends 83 and 84 to prevent a temperature valley 63 from occurring, as further discussed herein. In an example, the staggered distal capillary ends 81 through 86 can adjust a temperature profile that includes peaks 60, 59 and valleys 63 such that it represents an ideal line 64. For instance, staggered distal capillary ends 83 and 84 can be disposed in the region associated with valley 63 to increase a steam flow in the region associated with valley 63, such that the temperature is increased and such that the temperature profile more closely correlates with ideal temperature profile 64.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It will be further appreciated that for conciseness and clarity, spatial terms such as "vertical," "horizontal," "up," and "down" may be used herein with respect to the illustrated embodiments. However, these terms are not intended to be limiting and absolute.

Although at least one embodiment for continuous chamber capillary control, system, method, and apparatus has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A system for enhanced oil and gas recovery, comprising:
   a boiler;
   at least two capillaries in fluid communication with the boiler, wherein the at least two capillaries are disposed in an injector pipe and each one of the capillaries includes a flow control device for controlling an injection of steam in at least one of a chamber and a well for enhanced oil and gas recovery; and
   a producer conduit disposed in the at least one of the chamber and the well for enhanced oil and gas recovery, wherein the producer conduit includes a temperature feedback system that includes a plurality of temperature sensors wherein:
      the flow control devices control the injection of the steam, based on a feedback obtained from the temperature feedback system; and
      the flow control devices control the injection of steam in order to obtain a symmetric temperature profile in the at least one of the chamber and the well.

2. The system of claim 1, wherein the temperature sensors include a plurality of thermocouples.

3. The system of claim 1, wherein the temperature sensors are part of a fiberoptic temperature feedback system.

4. The system of claim 1, wherein the capillaries are encased in insulation in the injector pipe.

5. The system of claim 1, further comprising individual flow meters in communication with each one of the capillaries, wherein a signal received from each one of the individual flow meters is used in control of the steam through each one of the capillaries.

6. The system of claim 1, wherein an end of each of the capillaries is disposed in the at least one of the chamber and the well in a staggered fashion.

7. The system of claim 1, wherein the temperature sensors include a plurality of thermocouples that are disposed in a continuous manner over the length of the chamber.

8. The system of claim 7, wherein a temperature difference over the plurality of thermocouples is less than 5 degrees Celsius.

9. The system of claim 7, wherein a temperature difference over the plurality of thermocouples is less than 10 degrees Celsius.

10. A system for enhanced oil and gas recovery, comprising:
    a boiler; and
    at least two capillaries in fluid communication with the boiler, wherein the at least two capillaries are disposed in an injector pipe and each one of the capillaries includes a flow control device for controlling an injection of steam in at least one of a chamber and a well for enhanced oil and gas recovery, wherein the flow control device provides for an automatic control of the steam through each of the at least two capillaries; and
    a producer conduit disposed in the at least one of the chamber and the well for enhanced oil and gas recovery, wherein the producer conduit includes a temperature feedback system that includes a plurality of temperature sensors wherein:
       the flow control devices control the injection of the steam, based on a feedback obtained from the temperature feedback system; and
       the flow control devices control the injection of steam in order to obtain a symmetric temperature profile in the at least one of the chamber and the well.

11. The system of claim 10, wherein the automatic control of steam is based on a self-learning control algorithm.

12. The system of claim 11, wherein the self-learning control algorithm is a statistically based program.

13. A system for enhanced oil and gas recovery, comprising:
    a boiler; and
    at least two capillaries in fluid communication with the boiler, wherein the at least two capillaries are disposed in an injector pipe and each one of the capillaries includes a flow control device for controlling an injection of steam in at least one of a chamber and a well for enhanced oil and gas recovery, wherein the flow control device provides for an automatic control of the steam through each of the at least two capillaries, and wherein automatic control of the steam is based on a self-learning algorithm; and
    a producer conduit disposed in the at least one of the chamber and the well for enhanced oil and gas recovery, wherein the producer conduit includes a temperature feedback system that includes a plurality of temperature sensors, which provides a plurality of temperature inputs for the self-learning algorithm wherein:
       the flow control devices control the injection of the steam, based on a feedback obtained from the temperature feedback system; and
       the flow control devices control the injection of steam in order to obtain a symmetric temperature profile in the at least one of the chamber and the well.

14. The system of claim 13, wherein a temperature difference over the plurality of temperature sensors is less than 5 degrees Celsius.

15. The system of claim 13, wherein a temperature difference over the plurality of temperature sensors is less than 10 degrees Celsius.

* * * * *